(12) United States Patent
Dudda et al.

(10) Patent No.: US 10,555,356 B2
(45) Date of Patent: Feb. 4, 2020

(54) METHODS OF OPERATING NETWORK NODES IN A COMMUNICATION NETWORK, AND NETWORK NODES IMPLEMENTING THE SAME

(71) Applicant: Telefonaktiebolaget LM Ericsson (publ), Stockholm (SE)

(72) Inventors: Torsten Dudda, Aachen (DE); Mattias Bergström, Stockholm (SE); Helka-Liina Määttanen, Helsinki (FI); Gino Masini, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/749,281

(22) PCT Filed: Aug. 5, 2016

(86) PCT No.: PCT/SE2016/050741
§ 371 (c)(1),
(2) Date: Jan. 31, 2018

(87) PCT Pub. No.: WO2017/030483
PCT Pub. Date: Feb. 23, 2017

(65) Prior Publication Data
US 2018/0227976 A1    Aug. 9, 2018

Related U.S. Application Data

(60) Provisional application No. 62/205,134, filed on Aug. 14, 2015.

(51) Int. Cl.
*H04W 76/15* (2018.01)
*H04W 92/20* (2009.01)
*H04W 76/34* (2018.01)

(52) U.S. Cl.
CPC ........... *H04W 76/15* (2018.02); *H04W 76/34* (2018.02); *H04W 92/20* (2013.01)

(58) Field of Classification Search
None
See application file for complete search history.

(56) References Cited

U.S. PATENT DOCUMENTS

2013/0242843 A1 * 9/2013 Kojima ................... H04W 4/06 370/312
2014/0307586 A1 * 10/2014 Zhang ................... H04L 5/0098 370/254

(Continued)

FOREIGN PATENT DOCUMENTS

EP    3331273 A1 *    3/2016

OTHER PUBLICATIONS

Intel Corporation et al., "Agreements on LTE-WLAN Radio Level Integration and Interworking Enhancement", 3GPP TSG-RAN2 Meeting 89-bis, Apr. 20-24, 2015, pp. 1-5, Bratislava, Slovakia, R2-152922.

(Continued)

*Primary Examiner* — Ajit Patel
(74) *Attorney, Agent, or Firm* — Coats & Bennett, PLLC

(57) ABSTRACT

In one aspect, there is provided a method of operating a first network node in a first communication network that operates according to a first radio access technology, RAT, the method comprising sending (1001) a request message (501; 601; 703; 801; 901) from the first network node to a second network node in a second communication network that operates according to a second RAT to initiate, modify and/or stop aggregation of user traffic for a terminal device via the first network node and the second network node; wherein the first RAT is different to the second RAT.

12 Claims, 10 Drawing Sheets

(56) References Cited

U.S. PATENT DOCUMENTS

| | | | | |
|---|---|---|---|---|
| 2014/0329526 | A1* | 11/2014 | Sundararajan | H04W 36/24 455/436 |
| 2015/0215809 | A1* | 7/2015 | He | H04L 61/2038 370/338 |
| 2015/0334724 | A1* | 11/2015 | Faccin | H04W 76/36 370/235 |
| 2016/0174107 | A1* | 6/2016 | Kanugovi | H04L 12/28 370/236 |
| 2016/0255632 | A1* | 9/2016 | Forssell | H04W 76/15 370/329 |
| 2018/0220474 | A1* | 8/2018 | Laselva | H04W 28/08 |
| 2018/0279142 | A1* | 9/2018 | Mustajarvi | H04L 43/0888 |

OTHER PUBLICATIONS

Intel Corporation et al., "New WI Proposal LTE-WLAN Radio Level Integration and Interworking Enhancement", 3GPP TSG RAN Meeting #67, Mar. 9-12, 2015, pp. 1-9, Shanghai, China, RP-150510.

Ericsson, "LTE-WLAN aggregation", 3GPP TSG-RAN WG2 #89bis, Apr. 20-24, 2015, pp. 1-7, Bratislava, Slovakia, Tdoc R2-151438.

Nokia Networks, "Control plane protocol architecture for LTE-WLAN integration", 3GPP TSG-RAN WG2 Meeting #90, May 25-29, 2015, pp. 1-4, Fukuoka, Japan, R2-152103.

Catt, "Discussion on Architectural and Procedure of C-plane for LTE-WLAN Aggregation", 3GPP TSG RAN WG2 Meeting #90, May 25-29, 2015, pp. 1-5, Fukuoka, Japan, R2-152125.

3rd Generation Partnership Project, "Technical Specification Group Radio Access Network; Evolved Universal Terrestrial Radio Access Network (EUTRAN) and Wireless LAN (WLAN); Xw application protocol (XwAP) (Release 13)", 3GPP TS 36.463 V0.3.0, Nov. 2015, pp. 1-65.

Ericsson, "Signalling flows for LTE-WLAN aggregation over Xw and RRC", 3GPP TSG-RAN WG2 #91, Aug. 24-28, 2015, pp. 1-6, Beijing, China, R2-153693.

* cited by examiner

METHODS OF OPERATING NETWORK NODES IN A COMMUNICATION NETWORK, AND NETWORK NODES IMPLEMENTING THE SAME

TECHNICAL FIELD

This disclosure relates to network nodes in a communication network, and in particular relates to signalling between network nodes in communication networks operating according to different radio access technologies.

BACKGROUND

The wireless local-area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications").

The IEEE 802.11 specifications regulate the functions and operations of the Wi-Fi access points (APs) or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies (RATs). Network operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users in their regular cellular networks.

In particular, cellular network operators are seeking ways to offload traffic from their cellular networks to Wi-Fi, e.g. in peak-traffic-hours and in situations when the cellular network for one reason or another needs to be off-loaded, e.g. to provide requested quality of service, maximise bandwidth or simply for coverage.

Portable wireless devices or terminal devices (also referred to in 3GPP as user equipments—UEs) today usually support both Wi-Fi and a number of 3GPP cellular technologies, but many of the terminal devices are effectively behaving as two separate devices from a radio access perspective. The 3GPP radio access network (RAN) and the modems and protocols that are operating pursuant to the 3GPP specifications are basically unaware of the wireless access Wi-Fi protocols and modems that are operating pursuant to the 802.11 specifications.

Techniques for access network selection (i.e. the selection of which type of network, e.g. 3GPP or WLAN, a UE should access or connect to) and traffic steering (i.e. the selection of a network to be used for a particular data flow) are being discussed and agreed in 3GPP.

Another way in which cellular network operators intend to use Wi-Fi is to use aggregation. 3GPP/WLAN aggregation is a feature whereby a UE may at least receive (and possibly also transmit) data using links to both the 3GPP network and a WLAN. This is similar in principle to dual connectivity LTE, but it aggregates carriers from different radio access technologies (RATs), e.g. a 3GPP network and Wi-Fi. 3GPP/WLAN aggregation is currently being standardized by 3GPP in Release 13 as part of "LTE-WLAN Radio Level Integration and Interworking Enhancement", RP-150510 which was submitted to 3GPP TSG RAN Meeting #67 in Shanghai, China on 9-12 Mar. 2015.

In a split bearer architecture option for LTE/WLAN aggregation in the downlink, data is split on a packet data convergence protocol (PDCP) layer in the eNB (which is a term used to describe a radio base station in LTE). The eNB may route PDCP packet data units (PDUs) dynamically via eNB radio link control (RLC) to the UE directly, or via a backhaul channel to WLAN and then to the UE. In a separate bearer architecture option, the lower layers of a bearer are switched to LTE or WLAN meaning all PDCP packets of that bearer are routed via either LTE or the WLAN side.

FIG. 1 shows an exemplary protocol architecture for LTE/WLAN aggregation and illustrates a protocol architecture for the eNB 2, a "WLAN termination point" 4 and a UE 6. Other protocol architectures are also being considered. The WLAN termination point 4 in the network is denoted WLAN termination (WT) and may be implemented by a WLAN access point (AP) and/or access controller (AC) or another network node. The interface protocol between eNB 2 and WT 4 is denoted Xw and is used to exchange control plane and user plane information between the eNB 2 and WT 4.

For mobility, it is envisaged that the eNB or other network node in the 3GPP network is in control of which WLANs a UE should use for aggregation. However, the UE is in control of which node is actually used for aggregation and/or which network is selected for access and which network node traffic is steered to. Thus, an eNB or other network node can provide the UE with a set of WLANs or WLAN nodes that the UE can consider when deciding which node to use for aggregation. In some case the decision on which node is used for aggregation may be transparent to the eNB. This set, or a similar set, may also be used when performing access network selection or traffic steering. The set may be provided in the form of a set of identifiers for the WLANs or WLAN nodes, which may be Service Set Identifiers (SSIDs), Extended SSIDs (ESSIDs), Homogeneous ESSIDs (HESSIDs), Basic SSIDs (BSSIDs), or a realm identifier. This set is referred to herein as a mobility set or a mobility set.

SUMMARY

On the issue of aggregation, a Change Request (number R2-152922) submitted to 3GPP TSG-RAN2 Meeting 89-bis 20-24 Apr. 2015 contains a number of assumptions:

evolved UMTS Terrestrial Radio Access Network (E-UTRAN) supports LTE/WLAN aggregation (LWA) operation whereby a UE in RRC_CONNECTED mode is configured by the eNB to utilize the radio resources of LTE and WLAN.

The eNB supporting LWA is connected to WLAN via an ideal/internal backhaul in a collocated deployment scenario (i.e. where the eNB and WLAN node are in the same location/directly connected to each other) or a non-ideal backhaul in a non-collocated deployment scenario (i.e. where the eNB and WLAN node are not in the same location or not directly connected to each other).

In the non-collocated scenario, the eNB is connected to a "WLAN Termination" (WT) logical node.

The Xw user plane interface (Xw-U) and the Xw control plane interface (Xw-C) are defined between eNB and WT.

The UE supporting LWA may be configured by the E-UTRAN to perform WLAN measurements.

The eNB provides the UE with a group of APs (e.g. by SSID, HESSID or BSSID) among which WLAN mobility mechanisms apply while still supporting LWA, i.e., the UE may perform mobility (within a group of APs) transparent to the eNB. UE mobility across such groups of APs is controlled by the eNB e.g. based on measurement reports provided by the UE.

However, one of the issues with LTE-WLAN aggregation is that it is currently unclear how to add, modify and release the LTE-WLAN aggregation for a UE. In particular, it is currently unclear what signaling is required between an eNB, WT and UE in order to add, modify and release aggregation for the UE. Similar problems exist in providing aggregation over any two different types of networks (i.e. networks operating according to different radio access technologies, RATs).

Thus, the techniques described herein provide procedures in one or more networks to provide aggregation functionality for a UE. The procedure, in particular embodiments that are limited to a 3GPP standardized network (such as LTE) and WLAN, comprises signaling between an eNB and WLAN termination node (WT).

In this signaling, the eNB can request the addition or modification of WLAN connectivity for the UE from the WT. In this request, the eNB can include at least one of: a UE identifier, a set of WLAN identifiers, a radio bearer configuration, WLAN security parameters, measurement results associated with the WLAN identifiers.

The WT may reply to the request with an acknowledgement if the WT is able provide the WLAN connectivity for that UE. The WT may include in the reply message at least one of: a set of WLAN identifiers or subset of WLAN identifiers of the set provided by the eNB, transport network tunneling addresses, the predicted performance of the UE in WLAN. If the WT is not able to provide WLAN connectivity for that UE the WT may reply to the request with a negative acknowledgement.

The signaling may further comprise the eNB configuring the UE with a set of WLAN identifiers, which is a subset of the set of WLAN identifiers provided by the WT.

Thus, the signaling proposed herein provides a way for the efficient configuration and modification of LTE WLAN aggregation functionality for a UE.

More general embodiments of the techniques described herein are set out below.

Methods of operating a first network node in a first communication network that operates according to a first radio access technology, RAT, are provided.

The methods relate to the aggregation of user traffic for a terminal device via the first network node and a second network node in a second communication network that operates according to a second RAT (that is different to the first RAT).

In these methods, the first network node communicates with the second network node to initiate, modify and/or stop aggregation of user traffic via the first network node and the second network node.

In particular embodiments, the methods can comprise the step of sending a request message from the first network node to the second network node.

The request message can request one of:
  the addition or modification of a connection between the second network node and a terminal device that is or can be used for aggregation
  the stopping of aggregation of data traffic for the terminal device; or
  the release of a connection between the terminal device and the second network node that is used for aggregation.

Where the request message relates to the addition or modification of a connection, the request message can include any one or more of the following types of information:
  an identifier for the terminal device;
  an identifier or set of identifiers of network nodes in the second communication network that are requested to provide connections to the terminal device;
  an identifier and configuration of one or more radio bearers of the terminal device for which the second network node is requested to provide a connection for;
  security parameters for use by the terminal device and/or second network node in authentication and/or encrypting communications between the terminal device and the second network node; and
  measurements by the terminal device of signals from network nodes in the second communication network.

The identifier or set of identifiers of network nodes in the second communication network that are requested to provide connections to the terminal device that can be included in the request message can correspond to a network node or set of network nodes that the terminal device can connect to.

In some embodiments the first network node can send respective request messages to a plurality of network nodes in the second communication network.

The methods can further comprise the step of receiving a response message from the second network node.

The response message can include any one or more of the following types of information:
  an acknowledgement of the request message sent to the second network node;
  a negative acknowledgement of the request message indicating that the request cannot or will not be complied with;
  an identifier or set of identifiers of network nodes in the second communication network that can comply or are complying with the request message sent to the second network node;
  addresses of tunnels in a transport network that are to be used for forwarding data for the terminal device from the first network node to the second network node; and
  an indication of the performance that the second network node can provide to the terminal device.

In some embodiments the method can further comprise the step of configuring or reconfiguring the terminal device according to information in the received response message. The step of configuring or reconfiguring the terminal device can comprise:
   configuring or reconfiguring the terminal device to add or modify a connection between the terminal device and a network node in the second communication network; or
   configuring or reconfiguring the terminal device to stop aggregation of data traffic through the second network node.

In some embodiments, after the configuring or reconfiguring of the terminal device is complete, the first network node can send a message to the second network node to indicate that the configuring or reconfiguring of the terminal device is complete.

In some embodiments, the message indicating that the configuring or reconfiguring of the terminal device is complete can include security parameters for use by the terminal device and/or second network node in authentication and/or encrypting communications between the terminal device and the second network node.

In some embodiments, after receiving the response message, but prior to the completion of the configuring or reconfiguring of the terminal device, the first network node can send a message to the second network node to indicate that configuring or reconfiguring of the terminal device is intended.

In some embodiments, the message indicating that the configuring or reconfiguring of the terminal device is intended can include security parameters for use by the terminal device and/or second network node in authentication and/or encrypting communications between the terminal device and the second network node.

Where the request message comprises an identifier or set of identifiers of network nodes in the second communication network that are requested to provide connections to the terminal device (that may correspond to a network node or set of network nodes that the terminal device can connect to), the received response message may indicate the same set of identifiers or a subset of the set of identifiers corresponding to network nodes in the second communication network that can provide connections to the terminal device. In embodiments where the method further comprises the step of configuring or reconfiguring the terminal device according to information in the received response message, a configuration or reconfiguration message sent to the terminal device can include the identifier or identifiers indicated in the received response message.

In alternative embodiments, the method can comprise the step of receiving a request message from the second network node.

The request message can request one of:
   the addition or modification of a connection between the first network node and a terminal device that is or can be used for aggregation; or
   the stopping of aggregation of data traffic for the terminal device; or
   the release of a connection between the terminal device and the first network node that is used for aggregation.

Where the received request message relates to the addition or modification of a connection, the request message can include any one or more of the following types of information:
   an identifier for the terminal device;
   an identifier or set of identifiers of network nodes in the first communication network that are requested to provide connections to the terminal device;
   an identifier and configuration of one or more radio bearers of the terminal device for which the first network node is requested to provide a connection for;
   security parameters for use by the terminal device and/or first network node in authentication and/or encrypting communications between the terminal device and the first network node;
   measurements by the terminal device of signals from network nodes in the first communication network.

The identifier or set of identifiers of network nodes in the first communication network that are requested to provide connections to the terminal device included in the request message can correspond to a network node or set of network nodes that the terminal device can connect to.

The methods can further comprise the step of sending a response message from the first network node to the second network node.

The response message can include any one or more of the following types of information:
   an acknowledgement of the request message received from the second network node;
   a negative acknowledgement of the request message indicating that the request cannot or will not be complied with;
   an identifier or set of identifiers of network nodes in the first communication network that can comply or are complying with the request message sent to the first network node;
   addresses of tunnels in a transport network that are to be used for forwarding data for the terminal device from the second network node to the first network node; and
   an indication of the performance that the first network node can provide to the terminal device.

In some embodiments the method can further comprise the step of configuring or reconfiguring the terminal device according to information in the received request message. The step of configuring or reconfiguring the terminal device can comprise:
   configuring or reconfiguring the terminal device to add or modify a connection between the terminal device and a network node in the first communication network; or
   configuring or reconfiguring the terminal device to stop aggregation of data traffic through the first network node.

In some embodiments, after the configuring or reconfiguring of the terminal device is complete, the first network node can send a message to the second network node to indicate that the configuring or reconfiguring of the terminal device is complete.

In some embodiments, the message indicating that the configuring or reconfiguring of the terminal device is complete can include security parameters for use by the terminal device and/or second network node in authentication and/or encrypting communications between the terminal device and the second network node.

In some embodiments, after receiving the response message, but prior to the completion of the configuring or reconfiguring of the terminal device, the first network node can send a message to the second network node to indicate that configuring or reconfiguring of the terminal device is intended.

In some embodiments, the message indicating that the configuring or reconfiguring of the terminal device is intended, can include security parameters for use by the terminal device and/or second network node in authentication and/or encrypting communications between the terminal device and the second network node.

Where the request message comprises an identifier or set of identifiers of network nodes in the first communication network that are requested to provide connections to the terminal device (that may correspond to a network node or set of network nodes that the terminal device can connect to), the sent response message may indicate the same set of identifiers or a subset of the set of identifiers corresponding to network nodes in the first communication network that can provide connections to the terminal device. In embodiments where the method further comprises the step of configuring or reconfiguring the terminal device according to information in the sent response message, a configuration or reconfiguration message sent to the terminal device can include the identifier or identifiers indicated in the received response message.

The first RAT and second RAT can be any of Global System for Mobile communications, GSM, Universal Mobile Telecommunications System, UMTS, Wideband Code-Division Multiple Access, WCDMA, Long-Term Evolution, LTE, and Wi-Fi or WLAN.

The network node in the first communication network and the network node in the second communication network can be any of a base station, eNodeB, eNB, NodeB, macro/micro/pico/femto radio base station, home eNodeB, relay, repeater, sensor, a WLAN access point, AP, and a WLAN termination, WT.

In addition to the above methods, computer program product are also provided that comprise a computer readable medium having computer readable code embodied therein, the computer readable code being configured such that, on execution by a suitable computer or processor, the computer or processor is caused to perform any of the methods set out above.

Furthermore, various embodiments of network nodes are contemplated, where the network nodes are adapted to or configured to carry out any of the methods set out above, or comprise a processor and a memory, with the memory containing instructions executable by the processor whereby the network node is operative to carry out any of the methods set out above.

For example, according to a general embodiment, there is provided a first network node for use in a communication network operating according to a first RAT, wherein the first network node is adapted to or configured to communicate with a second network node in a second communication network that operates according to a second RAT to initiate, modify and/or stop aggregation of user traffic via the first network node and the second network node.

In another example of a general embodiment, there is provided a first network node for use in a communication network that operates according to a first RAT, with the first network node comprising a processor and a memory, said memory containing instructions executable by said processor whereby said first network node is operative to communicate with a second network node in a second communication network that operates according to a second RAT to initiate, modify and/or stop aggregation of user traffic via the first network node and the second network node.

According to a first aspect, there is provided a method of operating a first network node in a first communication network that operates according to a first radio access technology, RAT, the method comprising sending a request message from the first network node to a second network node in a second communication network that operates according to a second RAT to initiate, modify and/or stop aggregation of user traffic for a terminal device via the first network node and the second network node; wherein the first RAT is different to the second RAT.

According to a second aspect, there is provided a method of operating a first network node in a first communication network that operates according to a first radio access technology, RAT, the method comprising receiving a request message from a second network node in a second communication network that operates according to a second RAT to initiate, modify and/or stop aggregation of user traffic for a terminal device via the first network node and the second network node; wherein the first RAT is different to the second RAT.

According to a third aspect, there is provided a computer program product comprising a computer readable medium having computer readable code embodied therein, the computer readable code being configured such that, on execution by a suitable computer or processor, the computer or processor is caused to perform any of the method aspects or embodiments.

According to a fourth aspect, there is provided a first network node for use in a first communication network that operates according to a first radio access technology, RAT, the first network node being adapted to send a request message from the first network node to a second network node in a second communication network that operates according to a second RAT to initiate, modify and/or stop aggregation of user traffic for a terminal device via the first network node and the second network node; wherein the first RAT is different to the second RAT.

According to a fifth aspect, there is provided a first network node for use in a first communication network that operates according to a first radio access technology, RAT, the first network node being adapted to receive a request message from a second network node in a second communication network that operates according to a second RAT to initiate, modify and/or stop aggregation of user traffic for a terminal device via the first network node and the second network node; wherein the first RAT is different to the second RAT.

According to a sixth aspect, there is provided a first network node for use in a first communication network that operates according to a first radio access technology, RAT, the first network node comprising a processor and a memory, said memory containing instructions executable by said processor whereby said first network node is operative to send a request message from the first network node to a second network node in a second communication network that operates according to a second RAT to initiate, modify and/or stop aggregation of user traffic for a terminal device via the first network node and the second network node; wherein the first RAT is different to the second RAT.

According to a seventh aspect, there is provided a first network node of operating a first network node in a first communication network that operates according to a first radio access technology, RAT, the first network node comprising a processor and a memory, said memory containing instructions executable by said processor whereby said first network node is operative to receive a request message from a second network node in a second communication network that operates according to a second RAT to initiate, modify and/or stop aggregation of user traffic for a terminal device via the first network node and the second network node; wherein the first RAT is different to the second RAT.

According to an eighth aspect, there is provided a first network node for use in a first communication network that operates according to a first radio access technology, RAT, the first network node comprising a sending module configured to send a request message from the first network node to a second network node in a second communication network that operates according to a second RAT to initiate, modify and/or stop aggregation of user traffic for a terminal device via the first network node and the second network node; wherein the first RAT is different to the second RAT.

According to a ninth aspect, there is provided a first network node of operating a first network node in a first communication network that operates according to a first radio access technology, RAT, the first network node comprising a receiving module configured to receive a request message from a second network node in a second communication network that operates according to a second RAT to initiate, modify and/or stop aggregation of user traffic for a terminal device via the first network node and the second network node; wherein the first RAT is different to the second RAT.

Those skilled in the art will appreciate that the above embodiments are merely exemplary, and the above described features and steps can be combined in any suitable order or manner to provide the efficient configuration and modification of aggregation functionality for a terminal device.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
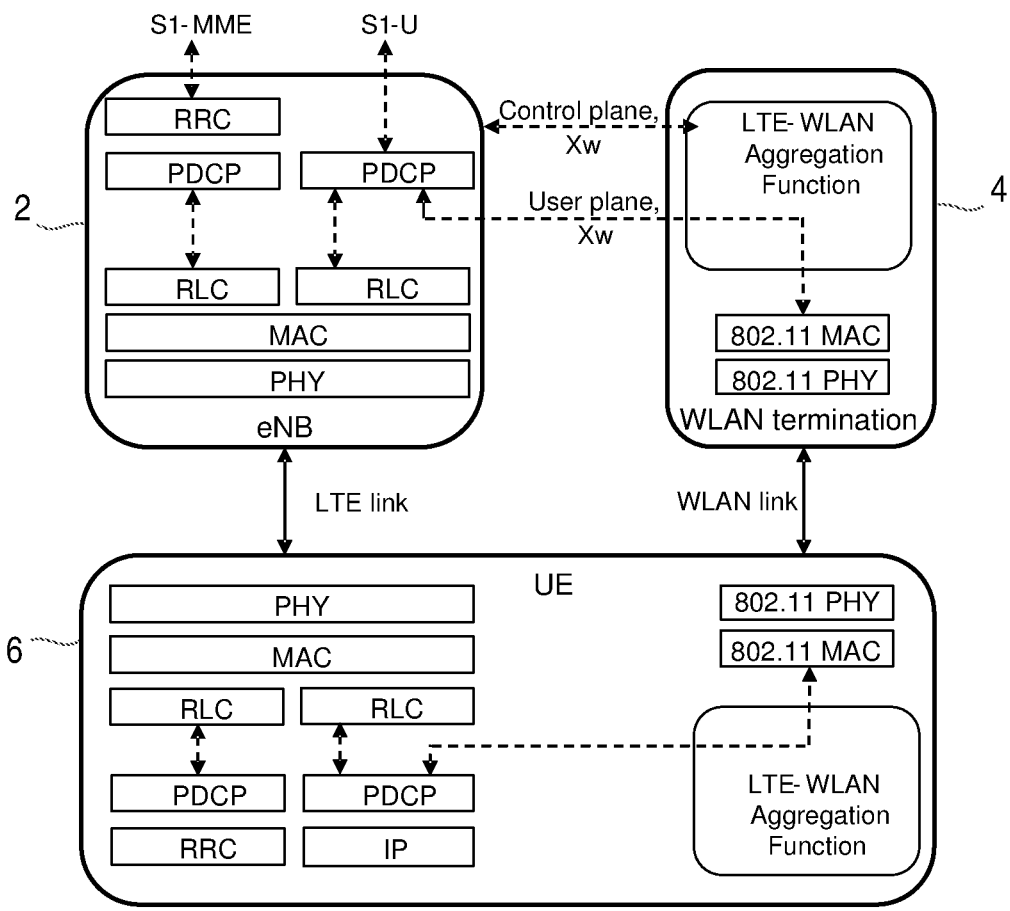
FIG. 1 illustrates an exemplary protocol architecture for LTE/WLAN aggregation.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device does not necessarily have to be 'mobile' in the sense that it is carried by a user. Instead, the terms "mobile device" and "terminal device" encompass any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink and/or receiving radio signals in the uplink. Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node" as used herein can refer to a base station, such as an eNodeB, a WLAN AP, a network node in the RAN responsible for resource management, such as a radio network controller (RNC), or, in some cases, a core network node, such as a mobility management entity (MME).

Unless otherwise indicated herein, the signalling described is either via direct links or logical links (e.g. via higher layer protocols and/or via one or more network nodes).

Figure 2:
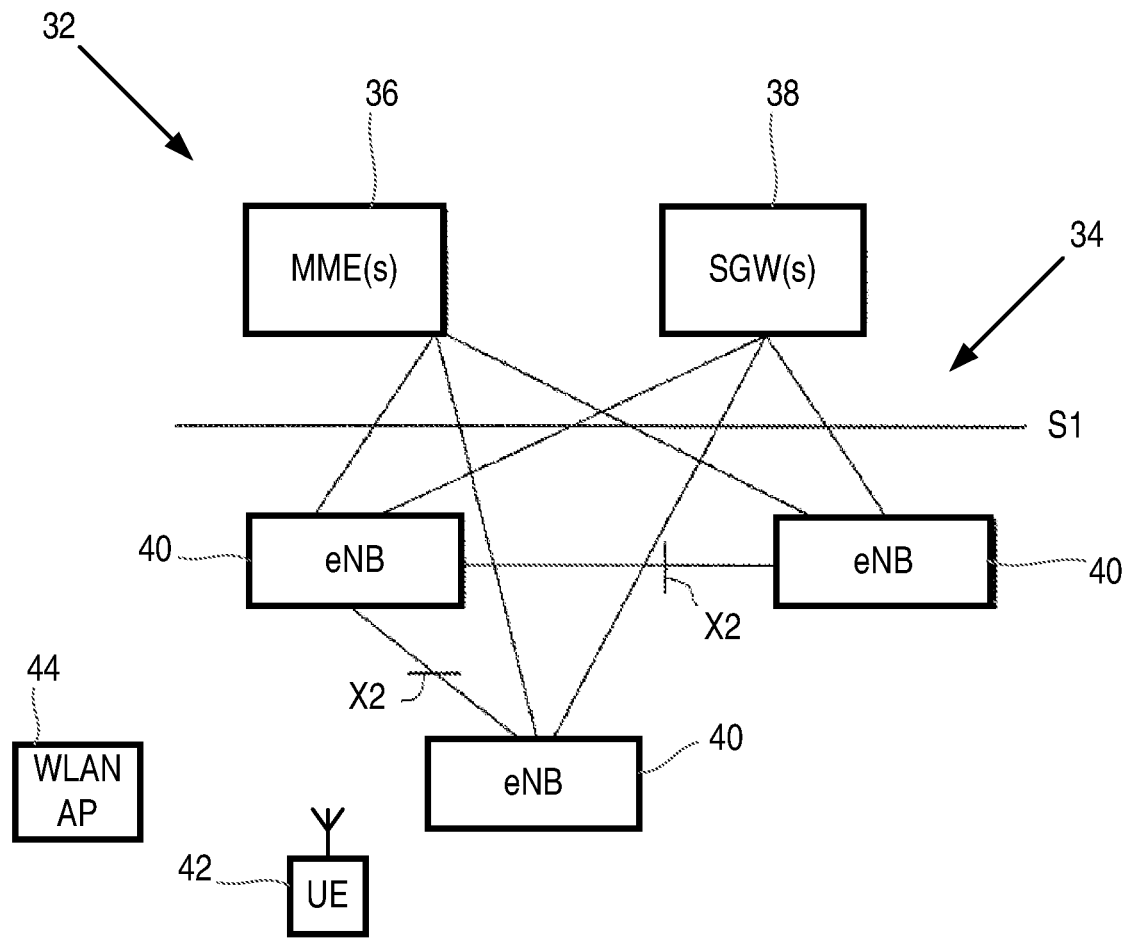
FIG. 2 illustrates an LTE network and WLAN APs.

FIG. 2 shows an example diagram of an evolved UMTS Terrestrial Radio Access Network (E-UTRAN) architecture as part of an LTE-based communications system 32 to which the techniques described herein can be applied. Nodes in a core network 34 part of the system 32 include one or more Mobility Management Entities (MMEs) 36, a key control node for the LTE access network, and one or more Serving Gateways (SGWs) 38 which route and forward user data packets while acting as a mobility anchor. They communicate with base stations 40 referred to in LTE as eNBs, over an interface, for example an S1 interface. The eNBs 40 can include the same or different categories of eNBs, e.g. macro eNBs, and/or micro/pico/femto eNBs. The eNBs 40 communicate with each other over an inter-node interface, for example an X2 interface. The S1 interface and X2 interface are defined in the LTE standard. A UE 42 is shown, and a UE 42 can receive downlink data from and send uplink data to one of the base stations 40, with that base station 40 being referred to as the serving base station of the UE 42. Although not part of the E-UTRAN architecture, a WLAN access point (AP) 44 is also shown in FIG. 2. The UE 42 can receive downlink data from and send uplink data to the AP 44.

Figure 3:
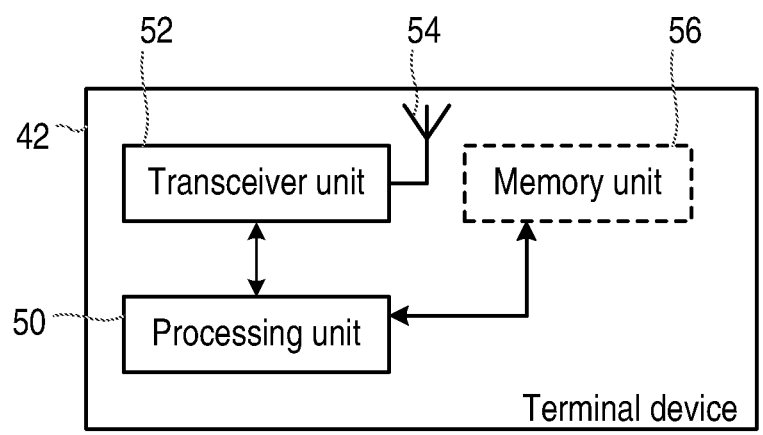
FIG. 3 is a block diagram of a terminal device according to an embodiment.

FIG. 3 shows a terminal device (UE) 42 that can be adapted or configured to operate according to one or more of the non-limiting example embodiments described. The UE 42 comprises a processor or processing unit 50 that controls the operation of the UE 42. The processing unit 50 is connected to a transceiver unit 52 (which comprises a receiver and a transmitter) with associated antenna(s) 54 which are used to transmit signals to and receive signals from a base station 40 in the network 32 and to transmit signals to and receive signals from a WLAN AP 44. The UE 42 also comprises a memory or memory unit 56 that is connected to the processing unit 50 and that contains instructions or computer code executable by the processing unit 50 and other information or data required for the operation of the UE 42.

Figure 4:
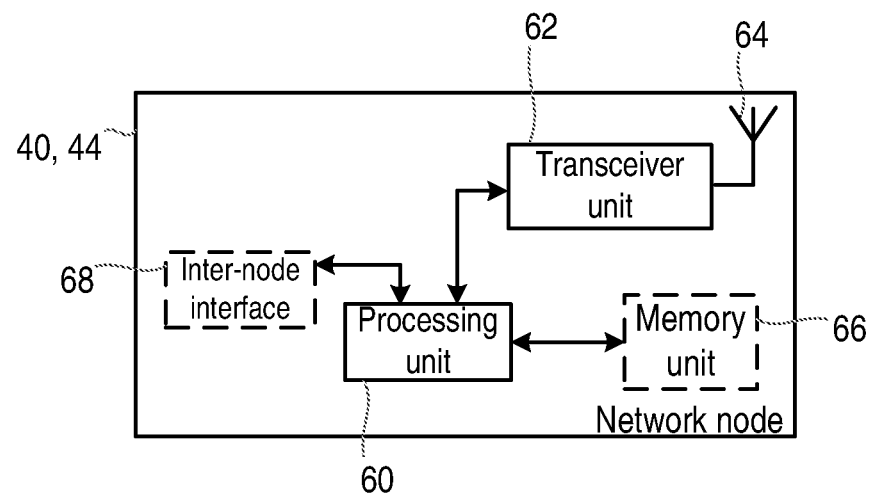
FIG. 4 is a block diagram of a network node according to an embodiment.

FIG. 4 shows a network node (for example a cellular network base station such as a NodeB or an eNodeB, or a WLAN node, such as a WLAN AP or WLAN termination, WT) that can be adapted or configured to operate according to the example embodiments described. The network node 40 comprises a processor or processing unit 60 that controls the operation of the network node 40. The processing unit 60 is connected to a transceiver unit 62 (which comprises a receiver and a transmitter) with associated antenna(s) 64 which are used to transmit signals to, and receive signals from, UEs 42 in the network 32. The network node 40 also comprises a memory or memory unit 66 that is connected to the processing unit 60 and that contains instructions or computer code executable by the processing unit 60 and other information or data required for the operation of the network node 50. The network node 40 also includes components and/or circuitry 68 for allowing the network node 40 to exchange information with another network node 40 (for example via an X2 S1 and/or Xw interface). It will be appreciated that base stations for use in other types of network (e.g. UTRAN or Wideband Code Division Multiple Access (WCDMA) radio access network (RAN)) will include similar components to those shown in FIG. 4 and appropriate interface circuitry 68 for enabling communications with the other network nodes in those types of networks (e.g. other base stations, APs mobility management nodes and/or nodes in the core network).

It will be appreciated that only the components of the UE 42 and network node 40 required to explain the embodiments presented herein are illustrated in FIGS. 3 and 4.

Although the embodiments of the present disclosure will mainly be described in the context of aggregation of LTE and WLAN, it will be appreciated by those skilled in the art that the problems and solutions described herein are equally applicable to other wireless access networks (and other combinations of wireless access networks) and user equipments (UEs) implementing other access technologies and standards, and thus LTE and WLAN (and the other LTE/WLAN specific terminology used herein, such as WT) should only be seen as examples of the technologies to which the techniques can be applied.

As noted above, it is currently unclear how to add, modify and release LTE-WLAN aggregation for a UE. However, the techniques described herein provide procedures in LTE networks and WLAN to provide aggregation functionality for a UE. The procedure, in particular embodiments, comprises signaling between an eNB and WLAN termination node (WT), e.g. a WLAN AP or WLAN node collocated with an eNB.

The following paragraphs set out exemplary content for messages signaled between an eNB and a WT according to the techniques described herein.

Signaling from eNB to WT:

In some embodiments the eNB can send a request message to the WT to request the WT add the WT to provide WLAN connectivity for a UE in LTE WLAN aggregation. In further or alternative embodiments the eNB may indicate to the WT to modify the configuration to provide WLAN connectivity for the UE.

The eNB may include at least one of the following indications in such a request message:

A proposed set of WLAN identifiers for which the WT is requested to provide WLAN connectivity to the UE. These WLAN identifiers may be selected by the eNB based on WLAN measurements provided to the eNB by the UE.

A list and/or configuration of radio bearers of the UE for which the WT is requested to provide WLAN connectivity. The configuration may include bearer identifiers and/or QoS parameters.

Security parameters, e.g. keys to derive WLAN security parameter keys to be used by the UE for authentication and/or encryption of the UE in WLAN.

Measurements for a UE related to the WLANs indicated by the WLAN identifiers. These measurements may have been reported from the UE to the eNB prior to the sending of the request message. This allows the WT to consider the measurements when determining whether a certain WLAN can/should provide WLAN connectivity to the UE, e.g. to exclude a WLAN if the measurements indicate signal conditions (e.g. signal strength) below a threshold.

UE identifier. The WT may have a need to treat different UEs differently and hence would need to know the identifier for the UE in the request. As an example, the WLAN MAC address of the UE as previously signaled by the UE to the eNB could be used. This allows the WT to correlate this information with e.g. the same identifier coming from the AP(s) where the UE connects to. This may be needed also for the IEEE 802.11 Open System Authentication (or other security functionality in WLAN) that may be used by the APs listed in the mobility set.

In some embodiments the eNB can send request messages (e.g. WT addition requests) to multiple WTs. This is beneficial for example if the eNB knows that the UE is in the coverage of WLANs associated with different WTs. The eNB may then, as explained in more detail below, select which of the WTs' WLAN to use based on the response (which may be implicit or explicit) from the WTs as well as estimated performance which will be provided by the WLANs.

In some embodiments, the eNB may include bearer information and/or mobility set information of several UEs in the same message. That is, the eNB may request WLAN connectivity for multiple UEs in the same message. Especially, if these UEs share e.g. the mobility set, that can be indicated in the message or specified such that there is no need to repeat the common information. Table 1 below gives an example of two UEs that share the same mobility set and part of the bearer information. In this example WLAN IDs for UE 2 are not repeated but the measurements are provided in the same order as for UE 1. It can be specified that if WLAN IDs of subsequent UEs are not provided, they share WLAN IDs of UE1. Or, there may be a bit indicating when this is the case and only additional WLAN IDs for the subsequent UEs are provided. Sharing the bearer information may be handled similarly.

TABLE 1

|  | UE ID 1 | UE ID 2 |
| --- | --- | --- |
| mobility set and possible measurements | WLAN IDs and corresponding measurements. | measurements for the mobility set |
| bearer information | bearer information for UE 1 | bearer information for UE 2 that is additional to bearer information of UE 1 and a bit indicating that UE2 shares bearer information with UE1 |
| security information | security information for UE1 | security information for UE2 |

Signaling from WT to eNB:

In some embodiments the WT can reply to the request message from the eNB to add or request to modify with a response message. The response message can be an acknowledgement indication. An acknowledgement indication may be sent per UE or common to the total request. The WT may include the following indications in such messages:

Simple ACK (positive acknowledgement) if the request has been accepted as it is.

Set of WLAN identifiers among which the WT confirms to the eNB to provide WLAN connectivity to the UE. This set may be a subset of the WLAN identifiers previously provided by the eNB to the UE. When the WT selects the subset of WLAN identifiers to be provided in the response message, it may consider measurements provided by the eNB in the WT addition request message.

Transport network tunneling addresses, to be used e.g. for user plane data that is to be forwarded by the eNB to the WT to be transmitted to the UE via WLAN.

Predicted performance which will be provided by the WLANs. For example, the WT may base this prediction on measurements provided in the WT Addition Request message and knowledge of the state of the WLANs (e.g. load, backhaul rate, etc.).

It should be noted that absence of the WT addition/modification Request ACK message from a WT may be used to trigger local error handling at the eNB.

If the WT deems or determines that WT addition not is possible and/or suitable, the WT may provide an empty set of WLAN identifiers in the response message. Alternatively, the WT can explicitly respond to the WT Addition/modification Request message with a message indicating that the WT deems WT addition not possible and/or suitable. This message will be referred to as WT addition/modification Request Failure.

eNB actions on receipt of a response message from WT:

In some embodiments, on receipt of a WT addition/modification Request ACK message the eNB reconfigures the UE to add/remove/modify the set of WLAN identifiers among which the UE can apply WLAN-based mobility (this set is herein referred to as the UE's "WLAN Mobility set"). Thereby the eNB chooses a subset of the set of WLAN identifiers provided by the WT.

It may be that the eNB has sent the WLAN addition/modification request message to multiple WTs and based on the response (which may be implicit or explicit as explained above) the eNB selects one WT (or rather one WLAN) with which aggregation should be performed, sends the WT reconfiguration complete message to the WT, and provides the UE with a mobility set corresponding to that WT.

In some embodiments the eNB provides the security parameters to the WT in a subsequent message (i.e. in a message which is sent after the WT Addition/modification Request ACK message). This may be beneficial for example in a scenario when the eNB has sent the WLAN addition/modification request message to multiple WTs. This information could for example be included in the WT reconfiguration complete message from eNB to WT. Alternatively, a message containing the security parameters can be sent before the reconfiguration of the UE has been started (but after the WT addition/modification ACK message was received), or before the reconfiguration of the UE has been completed.

Signalling Procedures:

Various exemplary signaling flows are shown in FIGS. 5-9. In the following, several assumptions and naming conventions have been adopted. They are:

The eNB has learned about WLAN IDs (SSID, HESSID, BSSSID) e.g. by initial measurements from the UE, or by local configuration.

The Xw interface has been established between eNB and WT.

"WlanMobilitySet" is defined as the set of WLAN identifiers configured by the eNB for the UE among which UE-based WLAN mobility is allowed.

"LWA bearer" is defined as the split bearer type (3C) for LTE WLAN aggregation, where PDCP PDUs may be routed directly to the UE or via the WT over WLAN to the UE. "LWA bearer" may also refer to 2C bearer type where PDCP PDUs are solely routed from eNB via WT over WLAN to UE. The following procedures are same for both 2C and 3C.

"WLAN connectivity provided by WT" is defined to refer to support for LWA bearers in the WLAN network, i.e. by the WT, e.g. flow control and data forwarding to APs included in the mobility set according to mobility decisions made by the UE, and WLAN security related support, which maybe particular to the LWA bearers.

WLAN security e.g. authentication and/or encryption parameters refers to keys to be used in WLAN or from which WLAN keys are derived. These parameter may be provided by eNB in an eNB-assisted WLAN security scheme.

Figure 5:
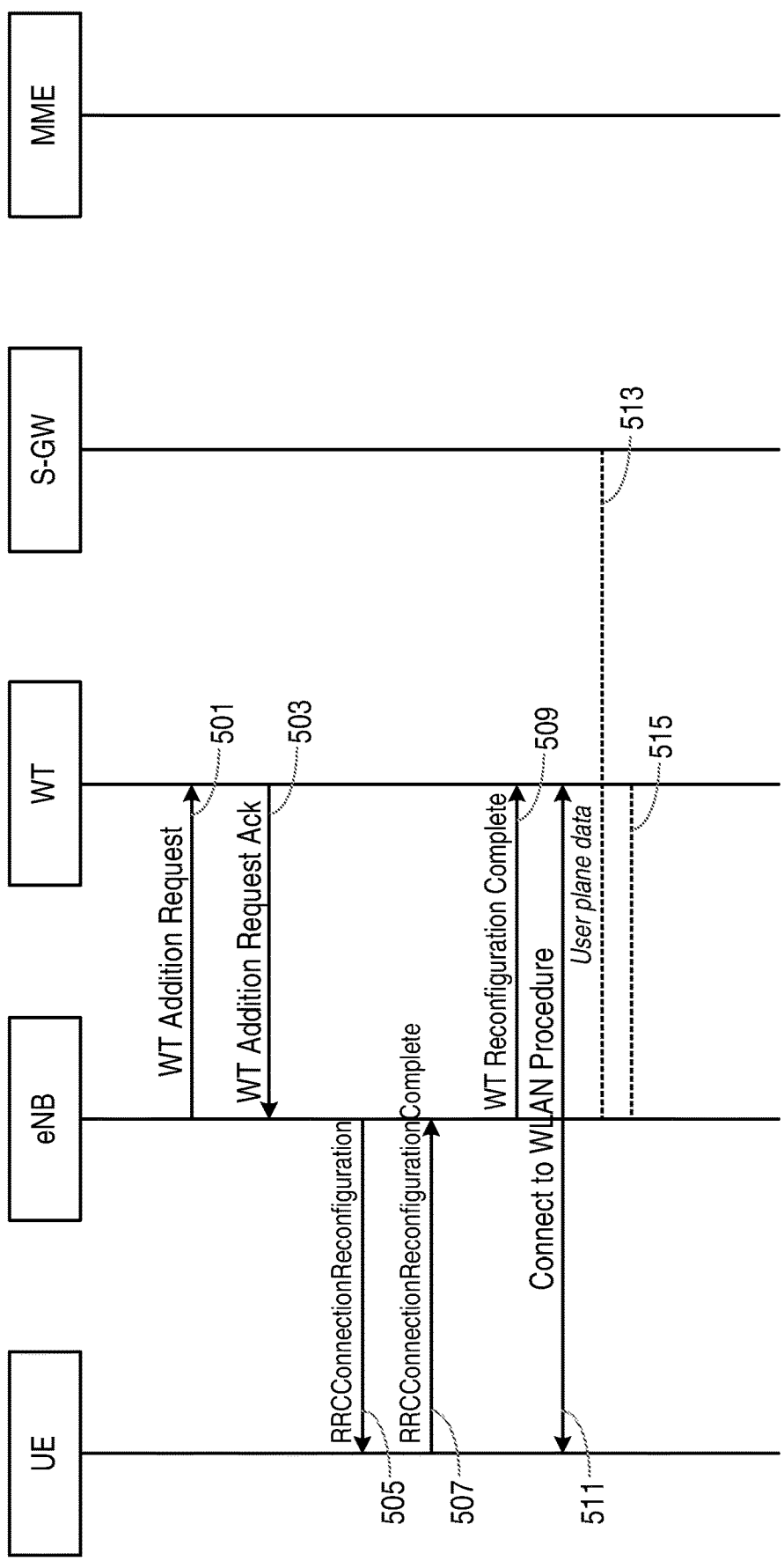
FIG. 5 is a signaling diagram illustrating the signaling in a first specific embodiment.

A WT addition procedure is illustrated in FIG. 5. The WT Addition procedure is initiated by the eNB and is used to prepare the WT to provide WLAN connectivity to the UE.

The eNB decides to request from the WT to provide WLAN connectivity for the UE (signal 501). As noted above, the eNB may indicate the UE identifier, e.g. the WLAN MAC address of the UE, the security parameters (keys) to be used in WLAN and WLAN identifiers to be used by the UE (WlanMobifitySet-Info). Furthermore, the eNB may indicate the LWA bearers (for which Xw UP entity needs to be established) and their QoS configuration. The WT may reject the request.

If the WT is able to provide WLAN connectivity to the UE, it replies to the eNB with an Acknowledgement message (signal 503). It may include the WLAN identifiers for which the WT is able to provide WLAN connectivity for the UE (WlanMobilitySet). The WT may indicate to the eNB the Xw DL TNL address information.

In some embodiments, transmission of user plane data may take place after signal 503 (as shown by signals 513 and 515).

The eNB sends the RRCConnectionReconfiguration message to the UE including the WlanMobilitySet or a subset thereof (signal 505).

The UE applies the new configuration and replies with RRCConnectionReconfigurationComplete message (signal 507). In case the UE is unable to comply with (part of) the configuration included in the RRCConnectionReconfiguration message, it performs the reconfiguration failure procedure.

Otherwise, the eNB informs the WT that the UE has completed the reconfiguration procedure successfully (signal 509). This message may include security parameters (keys) to be used in WLAN.

In some embodiments, the eNB informs the WT that it intends to reconfigure the UE, i.e. before the UE has completed the reconfiguration procedure successfully. This message may include security parameters (keys) to be used in WLAN.

The UE performs association and/or authentication and connection procedure to WLAN (illustrated by signal 511, although it will be appreciated that this may involve multiple signals sent between the WLAN and UE).

User plane data can then be sent to the UE and received from the UE via the eNB and WT (shown by signals 513 and 515).

Figure 6:
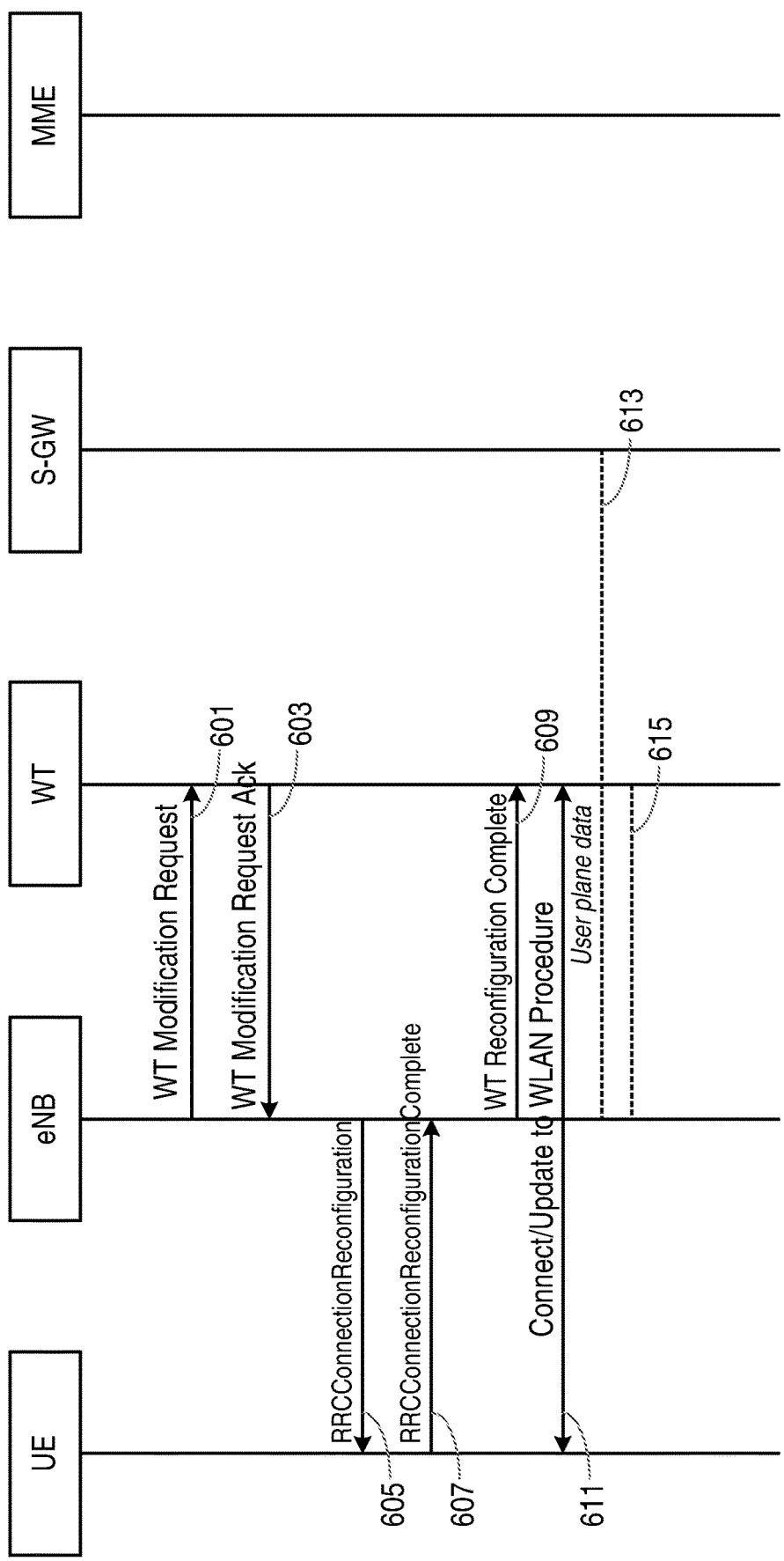
FIG. 6 is a signaling diagram illustrating the signaling in a second specific embodiment.

An eNB-initiated WT modification procedure is shown in FIG. 6. The WT Modification procedure may be initiated either by the eNB or by the WT and be used to modify the WLAN connectivity provided by the same WT for a UE. Similarly as in WT addition, also this message may be per more than one UE. The WT modification procedure does not necessarily need to involve signalling towards the UE.

The eNB sends the WT Modification Request message (signal 601), which may contain updates WLAN identifiers to be used by the UE (WlanMobilitySet-Info), or security parameters to be used in WLAN, authentication parameters, or changes of the LWA bearer configuration.

The WT responds with the WT Modification Request Acknowledge message—signal 603—(this indication may be implicit or explicit as explained above), which may contain for the LWA bearers a new DL GTP TEID (GPRS Tunnelling Protocol Tunnel Endpoint ID). The eNB shall continue sending DL PDCP PDUs to the WT with the previous DL GTP TEID until it performs PDCP re-establishment or PDCP data recovery, and use the new DL GTP TEID starting with the PDCP re-establishment or data recovery. The message further includes the WLAN identifiers for which the WT is able to provide WLAN connectivity for the UE (WlanMobilitySet).

Alternatively the WT may reject the request.

The eNB may initiate the RRC connection reconfiguration procedure (signal 605). The UE applies the new configuration and replies with RRCConnectionReconfigurationComplete (signal 607). In case the UE is unable to comply with (part of) the configuration included in the RRCConnectionReconfiguration message, it performs the reconfiguration failure procedure.

Upon successful completion of the reconfiguration, the success of the procedure is indicated in the WT Reconfiguration Complete message (signal 609). This message may include security parameters (keys) to be used in WLAN.

In some embodiments, the eNB informs the WT that it intends to reconfigure the UE, i.e. before the UE has completed the reconfiguration procedure successfully. This message may include security parameters (keys) to be used in WLAN.

If necessary due to updated WLAN mobility set, the UE performs association and/or authentication and connection to WLAN (illustrated by signal 611).

User plane data can then be sent to the UE and received from the UE via the eNB and WT (shown by signals 613 and 615).

Figure 7:
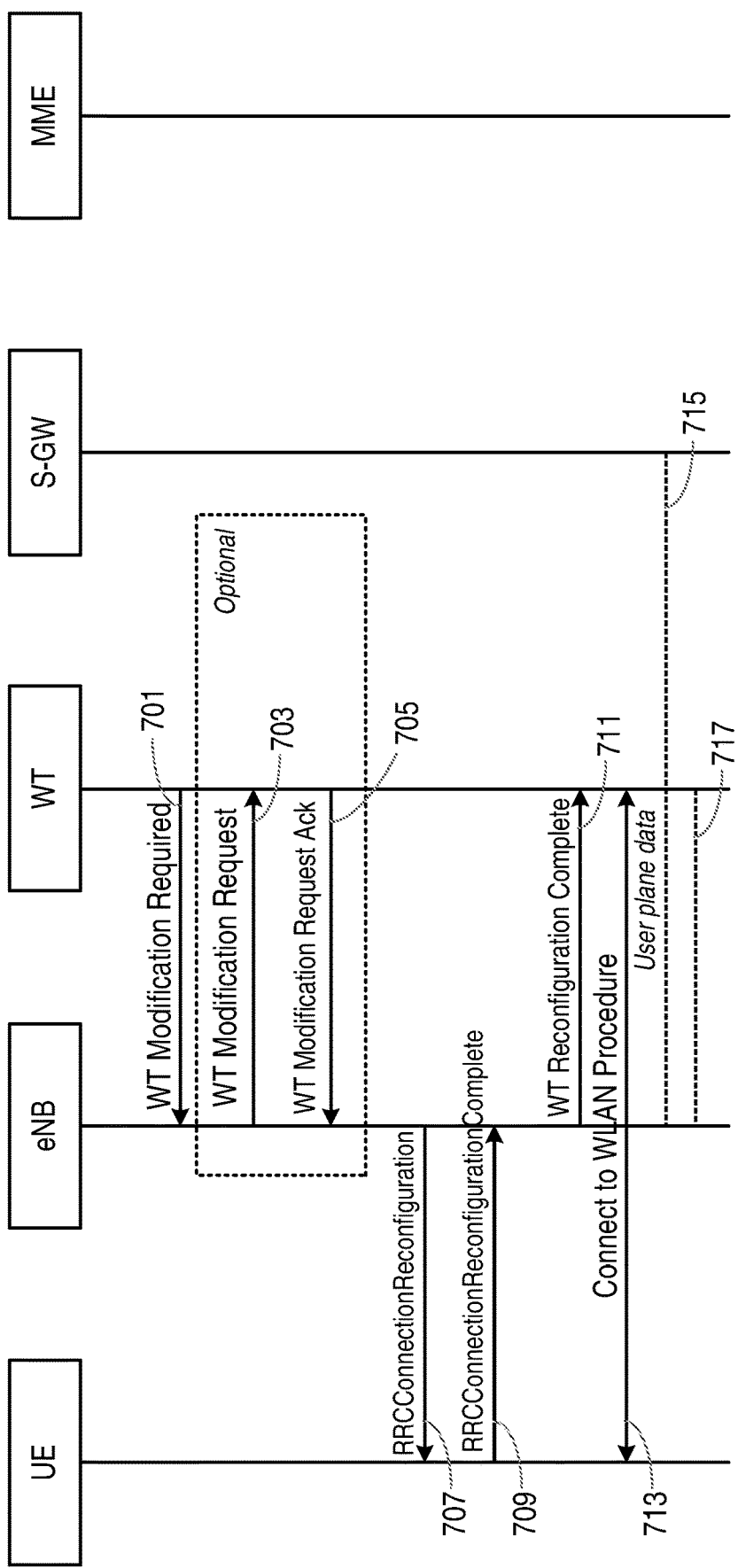
FIG. 7 is a signaling diagram illustrating the signaling in a third specific embodiment.

A WT-initiated WT modification procedure is shown in FIG. 7. The WT uses the procedure to perform configuration changes of the WLAN connection (upon which the eNB may react with further configuration changes).

The WT sends the WT Modification Required message (signal 701), which may contain WLAN bearer modification requests, updates of WLAN identifier list (WlanMobilitySet), etc.

If a WT security key change needs to be applied, changes in WLAN configuration, updates of the WLAN ID list (WlanMobilitySet-Info) or changes of the LWA bearer configuration, the eNB triggers the preparation of the eNB initiated WT Modification procedure (e.g. as described above in FIG. 6, and as shown in FIG. 7 by signals 703 and 705).

If eNB accepts the WT request, the eNB sends the RRCConnectionReconfiguration message (signal 707) to the UE including the new WLAN configuration e.g. the (Wlan-MobilitySet) or a subset thereof.

The UE applies the new configuration and replies with the RRCConnectionReconfigurationComplete message (signal 709). In case the UE is unable to comply with (part of) the configuration included in the RRCConnectionReconfiguration message, it performs a reconfiguration failure procedure.

Upon successful completion of the reconfiguration, the success of the procedure is indicated by the eNB to the WT in a WT Reconfiguration Complete message (signal 711). This message may include security parameters (keys) to be used in WLAN.

In some embodiments, the eNB informs the WT that it intends to reconfigure the UE, i.e. before the UE has completed the reconfiguration procedure successfully. This message may include security parameters (keys) to be used in WLAN.

If necessary due to updated WLAN mobility set, the UE performs authentication and connection to WLAN (represented by signal 713).

User plane data can then be sent to the UE and received from the UE via the eNB and WT (shown by signals 715 and 717).

Figure 8:
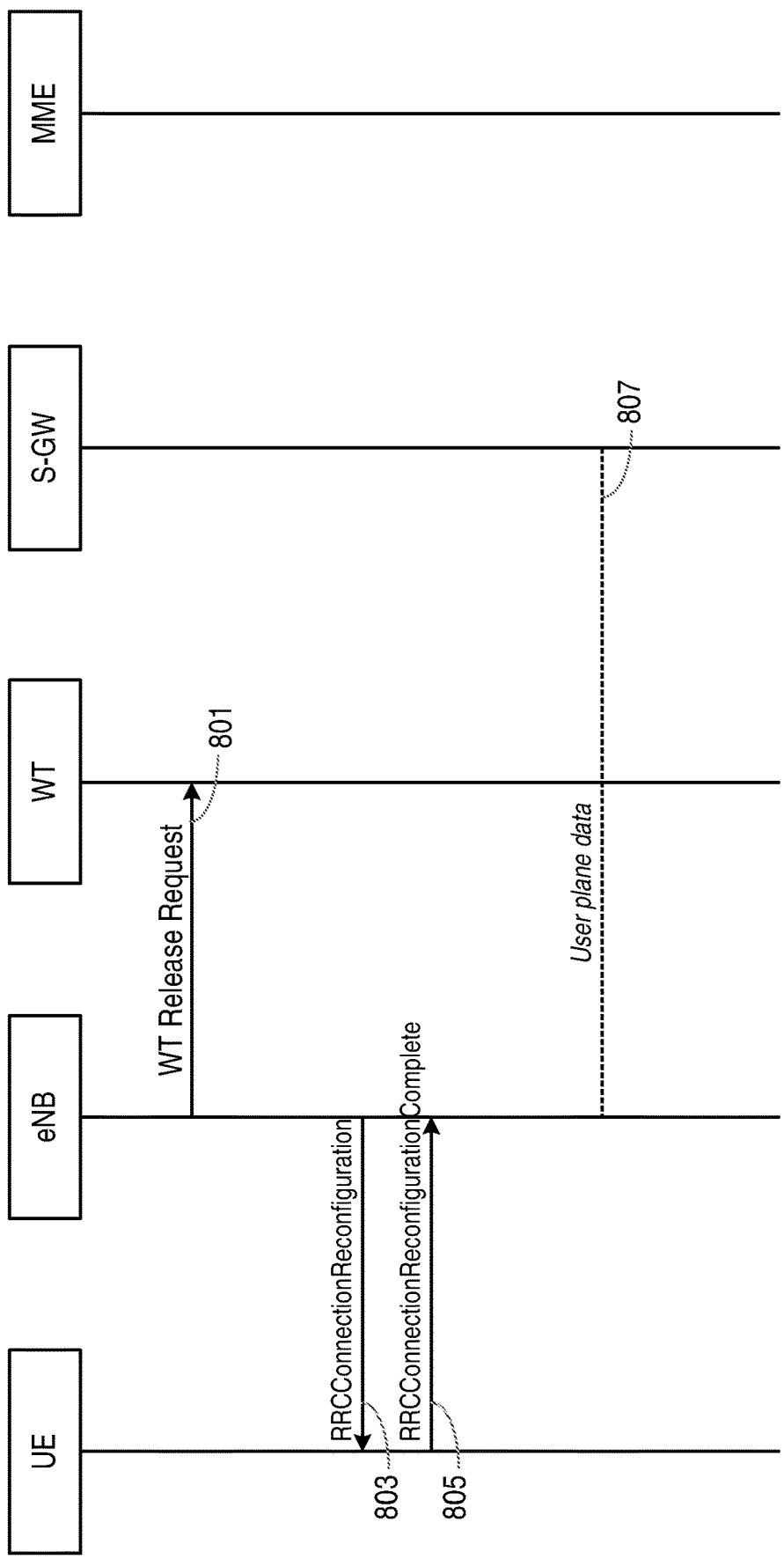
FIG. 8 is a signaling diagram illustrating the signaling in a fourth specific embodiment.

FIG. 8 illustrates a WT Release procedure. The WT Release procedure may be initiated either by the eNB or by the WT and is used to initiate the release of the UE at the WT. The recipient node of this request cannot reject it.

This procedure does not necessarily need to involve signalling towards the UE, e.g., RRC connection re-establishment due to Radio Link Failure in eNB.

The eNB initiates the procedure by sending the WT Release Request message (signal 801).

If required, the eNB indicates in the RRCConnectionReconfiguration message (signal 803) towards the UE that the UE shall release the entire WLAN configuration. In case the UE is unable to comply with (part of) the configuration included in the RRCConnectionReconfiguration message, it performs a reconfiguration failure procedure. Otherwise, the UE applies the new configuration and replies with the RRCConnectionReconfigurationComplete message (signal 805).

Upon reception of the WT Release request message, the WT is not required anymore to provide WLAN connection for the UE.

User plane data can then be sent to the UE via the eNB (shown by signal 807).

Figure 9:
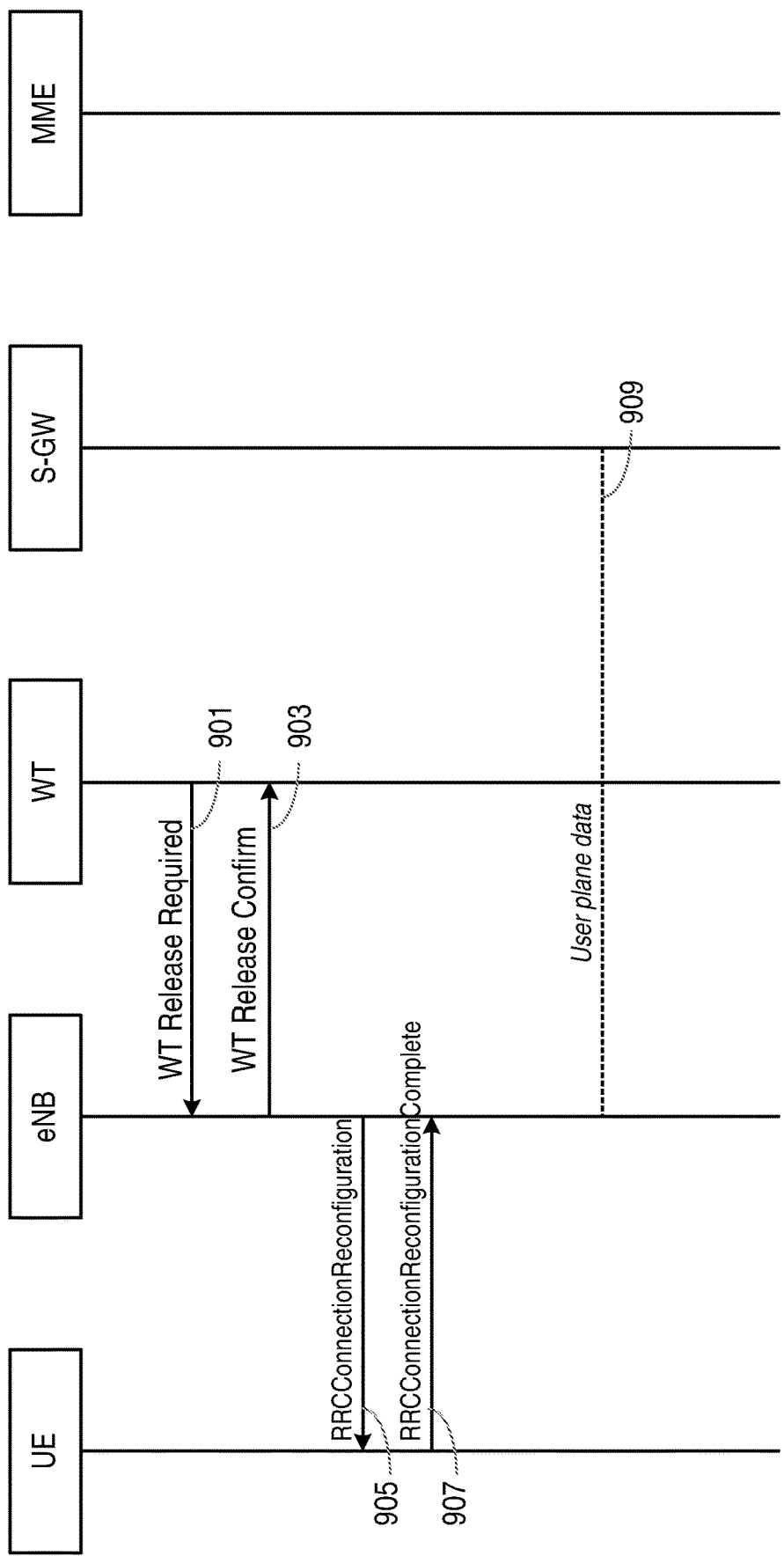
FIG. 9 is a signaling diagram illustrating the signaling in a fifth specific embodiment.

FIG. 9 illustrates an exemplary signalling flow for a WT-initiated WT Release procedure. The WT initiates the procedure by sending a WT Release Required message (signal 901). The eNB replies with a WT Release Confirm message (signal 903).

If required, the eNB indicates in the RRCConnectionReconfiguration message (signal 905) towards the UE that the UE shall release the entire WLAN configuration. In case the UE is unable to comply with (part of) the configuration included in the RRCConnectionReconfiguration message, it performs a reconfiguration failure procedure. Otherwise The UE applies the new configuration and replies with the RRCConnectionReconfigurationComplete message (signal 907).

Upon reception of the WT Release confirm message (signal 903), the WT is no longer required to provide a WLAN connection for the UE.

User plane data can then be sent to the UE via the eNB (shown by signal 909).

Figure 10:
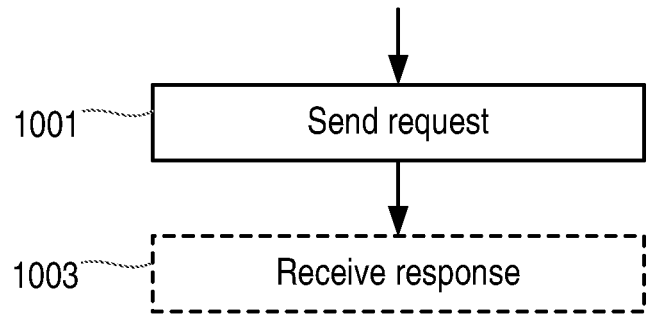
FIG. 10 is a flow chart illustrating a method of operating a first network node according to a general embodiment.

FIG. 10 illustrates a general method of operating a first network node according to the techniques described herein. The first network node is for use in a first communication network that operates according to a first radio access technology, RAT. The method relates to the aggregation of user traffic for a terminal device via the first network node and a second network node in a second communication network that operates according to a second RAT (that is different to the first RAT). For example in some embodiments the first network node can be an eNB in an LTE network and the second network node can be a WLAN AP or WT.

In this method, the first network node communicates with the second network node to initiate, modify and/or stop aggregation of user traffic via the first network node and the second network node.

Thus, in step 1001 the first network node sends a request message to the second network node. The request message can request any of the addition or modification of a connection between the second network node and a terminal device that is or can be used for aggregation; the stopping of aggregation of data traffic for the terminal device; and the release of a connection between the terminal device and the second network node that is used for aggregation.

Where the request message relates to the addition or modification of a connection, the request message can include any one or more of the following types of information:
  an identifier for the terminal device;
  an identifier or set of identifiers of network nodes in the second communication network that are requested to provide connections to the terminal device;
  an identifier and configuration of one or more radio bearers of the terminal device for which the second network node is requested to provide a connection for;
  security parameters for use by the terminal device and/or second network node in authentication and/or encrypting communications between the terminal device and the second network node; and
  measurements by the terminal device of signals from network nodes in the second communication network.

In some embodiments, the identifier or set of identifiers of network nodes in the second communication network that are requested to provide connections to the terminal device that can be included in the request message can correspond to a network node or set of network nodes that the terminal device can connect to.

In some embodiments the first network node can send respective request messages to a plurality of network nodes in the second communication network.

In some embodiments, the method further comprises the step of receiving a response message from the second network node (step 1003).

The response message can include any one or more of the following types of information:
  an acknowledgement of the request message sent to the second network node;
  a negative acknowledgement of the request message indicating that the request cannot or will not be complied with;
  an identifier or set of identifiers of network nodes in the second communication network that can comply or are complying with the request message sent to the second network node;

addresses of tunnels in a transport network that are to be used for forwarding data for the terminal device from the first network node to the second network node; and an indication of the performance that the second network node can provide to the terminal device.

Although not shown in FIG. 10, in some embodiments the method further comprises the step of configuring or reconfiguring the terminal device according to information in the received response message. The step of configuring or reconfiguring the terminal device can comprise:

configuring or reconfiguring the terminal device to add or modify a connection between the terminal device and a network node in the second communication network; or configuring or reconfiguring the terminal device to stop aggregation of data traffic through the second network node.

In some embodiments, after the configuring or reconfiguring of the terminal device is complete, the first network node can send a message to the second network node to indicate that the configuring or reconfiguring of the terminal device is complete.

In some embodiments, the message indicating that the configuring or reconfiguring of the terminal device is complete can include security parameters for use by the terminal device and/or second network node in authentication and/or encrypting communications between the terminal device and the second network node.

In some embodiments, after receiving the response message, but prior to the completion of the configuring or reconfiguring of the terminal device, the first network node can send a message to the second network node to indicate that configuring or reconfiguring of the terminal device is intended.

In some embodiments, the message indicating that the configuring or reconfiguring of the terminal device is intended, can include security parameters for use by the terminal device and/or second network node in authentication and/or encrypting communications between the terminal device and the second network node.

In embodiments where the request message comprises an identifier or set of identifiers of network nodes in the second communication network that are requested to provide connections to the terminal device (that may correspond to a network node or set of network nodes that the terminal device can connect to), the received response message may indicate the same set of identifiers or a subset of the set of identifiers corresponding to network nodes in the second communication network that can provide connections to the terminal device. In embodiments where the method further comprises the step of configuring or reconfiguring the terminal device according to information in the received response message, a configuration or reconfiguration message sent to the terminal device can include the identifier or identifiers indicated in the received response message.

Figure 11:
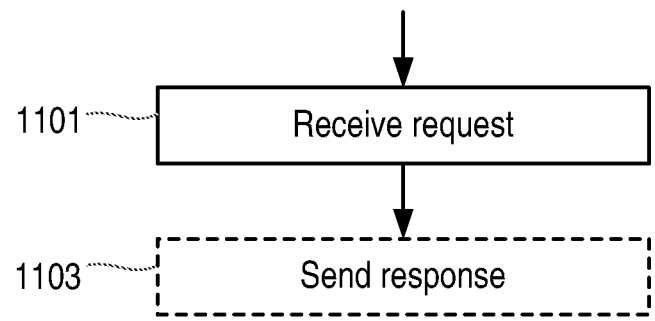
FIG. 11 is a flow chart illustrating a method of operating a first network node according to another general embodiment.

FIG. 11 illustrates another general method of operating a first network node according to the techniques described herein. It will be appreciated that the method illustrated in FIG. 11 corresponds to the network node that receives the request message that initiates the addition, modification or release of the aggregation, and thus the 'first network node' in FIG. 11 corresponds to the 'second network node' in FIG. 10 (and vice versa).

As in FIG. 10, the first network node is for use in a first communication network that operates according to a first radio access technology, RAT. The method relates to the aggregation of user traffic for a terminal device via the first network node and a second network node in a second communication network that operates according to a second RAT (that is different to the first RAT). For example the first network node can be a WLAN AP or WT and the second network node can be an eNB in an LTE network.

In this method, the first network node communicates with the second network node to initiate, modify and/or stop aggregation of user traffic via the first network node and the second network node.

In step 1101, the first network node receives a request message from the second network node.

The request message can request one of the addition or modification of a connection between the first network node and a terminal device that is or can be used for aggregation; the stopping of aggregation of data traffic for the terminal device; or the release of a connection between the terminal device and the first network node that is used for aggregation.

In embodiments where the received request message relates to the addition or modification of a connection, the request message can include any one or more of the following types of information:

an identifier for the terminal device;

an identifier or set of identifiers of network nodes in the first communication network that are requested to provide connections to the terminal device;

an identifier and configuration of one or more radio bearers of the terminal device for which the first network node is requested to provide a connection for;

security parameters for use by the terminal device and/or first network node in authentication and/or encrypting communications between the terminal device and the first network node;

measurements by the terminal device of signals from network nodes in the first communication network.

The identifier or set of identifiers of network nodes in the first communication network that are requested to provide connections to the terminal device included in the request message can correspond to a network node or set of network nodes that the terminal device can connect to.

In some embodiments, the method can further comprise the step of sending a response message from the first network node to the second network node (step 1103).

The response message can include any one or more of the following types of information:

an acknowledgement of the request message received from the second network node;

a negative acknowledgement of the request message indicating that the request cannot or will not be complied with;

an identifier or set of identifiers of network nodes in the first communication network that can comply or are complying with the request message sent to the first network node;

addresses of tunnels in a transport network that are to be used for forwarding data for the terminal device from the second network node to the first network node; and an indication of the performance that the first network node can provide to the terminal device.

In some embodiments the method can further comprise the step of configuring or reconfiguring the terminal device according to information in the received request message.

The step of configuring or reconfiguring the terminal device can comprise:

configuring or reconfiguring the terminal device to add or modify a connection between the terminal device and a network node in the first communication network; or configuring or reconfiguring the terminal device to stop aggregation of data traffic through the first network node.

In some embodiments, after the configuring or reconfiguring of the terminal device is complete, the first network node can send a message to the second network node to indicate that the configuring or reconfiguring of the terminal device is complete.

In some embodiments, the message indicating that the configuring or reconfiguring of the terminal device is complete can include security parameters for use by the terminal device and/or second network node in authentication and/or encrypting communications between the terminal device and the second network node.

In some embodiments, after receiving the response message, but prior to the completion of the configuring or reconfiguring of the terminal device, the first network node can send a message to the second network node to indicate that the configuring or reconfiguring of the terminal device is intended.

In some embodiments, the message indicating that the configuring or reconfiguring of the terminal device is intended, can include security parameters for use by the terminal device and/or second network node in authentication and/or encrypting communications between the terminal device and the second network node.

Where the request message comprises an identifier or set of identifiers of network nodes in the first communication network that are requested to provide connections to the terminal device (that may correspond to a network node or set of network nodes that the terminal device can connect to), the sent response message may indicate the same set of identifiers or a subset of the set of identifiers corresponding to network nodes in the first communication network that can provide connections to the terminal device. In embodiments where the method further comprises the step of configuring or reconfiguring the terminal device according to information in the sent response message, a configuration or reconfiguration message sent to the terminal device can include the identifier or identifiers indicated in the received response message.

Figure 12:
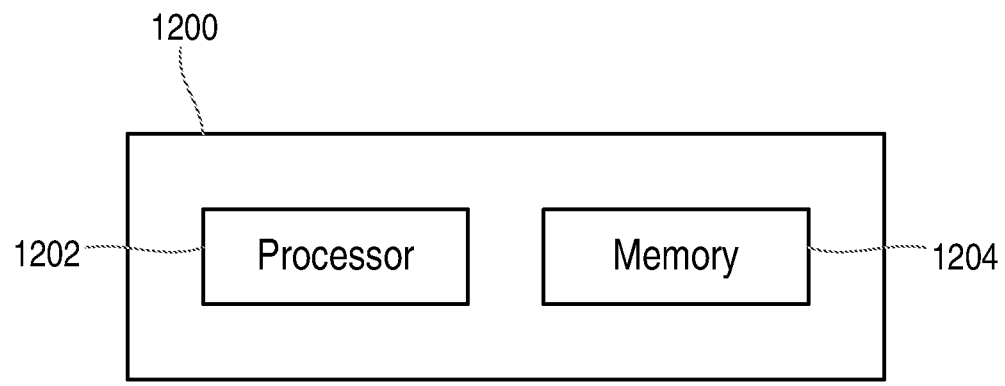
FIG. 12 is a block diagram of a network node according to a further embodiment.

FIG. 12 is a block diagram of a first network node 1200 (e.g. an eNB 40, WLAN AP 44 or WT) according to a further embodiment for use in the methods described above. The first network node 1200 is for use in a communication network 32, and the first network node comprises a processor 1202 and a memory 1204.

In some embodiments or implementations, the memory 1204 contains instructions executable by the processor 1202 whereby the first network node 1200 is operative to send a request message from the first network node to a second network node in a second communication network that operates according to a second RAT (which is different to the first RAT) to initiate, modify and/or stop aggregation of user traffic for a terminal device via the first network node and the second network node.

In other embodiments or implementations, the memory 1204 contains instructions executable by the processor 1202 whereby the first network node 1200 is operative to receive a request message from a second network node in a second communication network that operates according to a second RAT (which is different to the first RAT) to initiate, modify and/or stop aggregation of user traffic for a terminal device via the first network node and the second network node.

Figure 13:
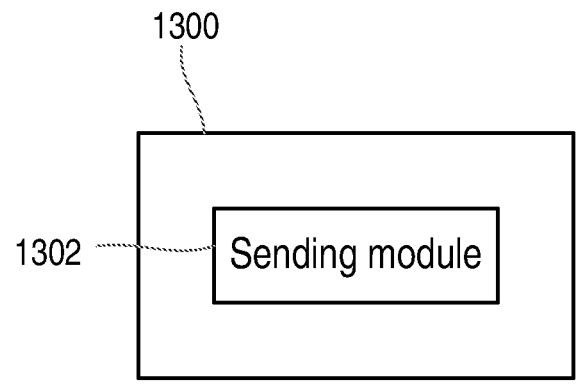
FIG. 13 is a block diagram of a network node according to another embodiment.

FIG. 13 is a block diagram of a first network node 1300 (e.g. an eNB 40, WLAN AP 44 or WT) according to another embodiment. The first network node 1300 is for use in a communication network 32, and comprises a sending module 1302 configured to send a request message from the first network node to a second network node in a second communication network that operates according to a second RAT (which is different to the first RAT) to initiate, modify and/or stop aggregation of user traffic for a terminal device via the first network node and the second network node.

Figure 14:
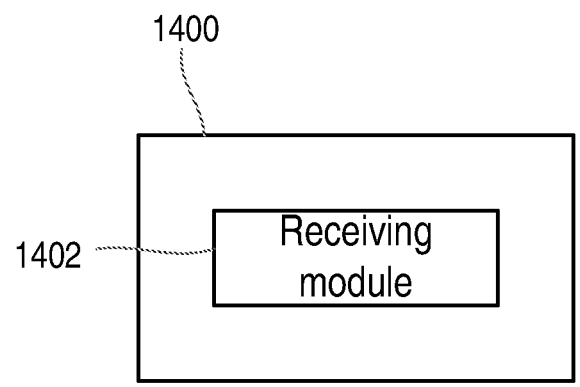
FIG. 14 is a block diagram of a network node according to another embodiment.

FIG. 14 is a block diagram of a first network node 1400 according to yet another embodiment. The first network node 1400 is for use in a communication network 32, and comprises a receiving module 1402 configured to receive a request message from a second network node in a second communication network that operates according to a second RAT (which is different to the first RAT) to initiate, modify and/or stop aggregation of user traffic for a terminal device via the first network node and the second network node.

Therefore the techniques described herein provide procedures in one or more networks to provide aggregation functionality for a UE.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a first network node in a first communication network that operates according to a first radio access technology (RAT), the method comprising:
    sending a request message from the first network node to a second network node in a second communication network that operates according to a second RAT to initiate, modify, and/or stop aggregation of user traffic for a terminal device via the first network node and the second network node, wherein the request message includes key information for use in at least one of authenticating and encrypting communications between the terminal device and the second communication network, and wherein the first RAT is different to the second RAT; and
    receiving, responsive to the request message, a response message from the second network node;
    initiating, responsive to the response message, a connection reconfiguration procedure to reconfigure a connection between the UE and the first communication network, the second communication network node or both according to the response message; and
    sending an indication message to the second network node when the connection reconfiguration procedure is complete.

2. The method of claim 1, wherein the request message requests the addition or modification of a connection between the second network node and the terminal device, where the connection is or can be used for aggregation.

3. The method of claim 2, wherein the request message includes any one or more of the following types of information:
    an identifier for the terminal device;
    an identifier or set of identifiers of the network nodes in the second communication network that are requested to provide connections to the terminal device;

an identifier and configuration of one or more radio bearers of the terminal device for which the second network node is requested to provide the connection for; and measurements by the terminal device of signals from network nodes in the second communication network.

4. The method of claim 3, wherein the identifier or the set of identifiers of the network nodes in the second communication network included in the request message correspond to a network node or set of network nodes that the terminal device can connect to.

5. The method of claim 1, wherein the request message requests the stopping of aggregation of data traffic for the terminal device, or a release of a connection between the terminal device and the second network node that is used for aggregation.

6. The method of claim 1, wherein the response message includes any one or more of the following types of information:

an acknowledgement of the request message sent to the second network node;

acknowledgement;

an identifier or set of identifiers of the network nodes in the second communication network that can comply or are complying with the request message sent to the second network node;

addresses of tunnels in a transport network that are to be used for forwarding data for the terminal device from the first network node to the second network node; and an indication of the performance that the second network node can provide to the terminal device.

7. The method of claim 1:

wherein the request message requests the addition or modification of a connection between the second network node and a terminal device, where the connection is or can be used for aggregation;

wherein the configuring connection reconfiguration comprises configuring or reconfiguring the terminal device to add or modify a connection between the terminal device and the second network node in the second communication network or the terminal device and a third network node in the second communication network.

8. The method of claim 1:

wherein the request message requests the stopping of aggregation of data traffic for the terminal device, or the release of a connection between the terminal device and the second network node that is used for aggregation;

wherein the connection reconfiguration comprises configuring or reconfiguring the terminal device to stop aggregation of data traffic through the second network node.

9. A first network node for use in a first communication network that operates according to a first radio access technology (RAT), the first network node comprising:

processing circuitry;

memory containing instructions executable by the processing circuitry whereby the first network node is operative to:

send a request message from the first network node to a second network node in a second communication network that operates according to a second RAT to initiate, modify, and/or stop aggregation of user traffic for a terminal device via the first network node and the second network node, wherein the request message includes key information for use in at least one of authenticating and encrypting communications between the terminal device and the second communication network, and wherein the first RAT is different to the second RAT;

receive, responsive to the request message, a response message from the second network node;

initiate, responsive to the response message, a connection reconfiguration procedure to reconfigure a connection reconfiguration between the UE and the first communication network, the second communication network or both; and send a reconfiguration complete message to the second network node when the connection reconfiguration procedure is complete.

10. The first network node of claim 9, wherein the request message requests the addition or modification of a connection between the second network node and the terminal device, where the connection is or can be used for aggregation.

11. The first network node of claim 10, wherein the request message includes any one or more of the following types of information:

an identifier for the terminal device;

an identifier or set of identifiers of the network nodes in the second communication network that are requested to provide connections to the terminal device;

an identifier and configuration of one or more radio bearers of the terminal device for which the second network node is requested to provide the connection for; and measurements by the terminal device of signals from the network nodes in the second communication network.

12. The first network node of claim 11, wherein the identifier or set of identifiers of the network nodes in the second communication network included in the request message correspond to a network node or set of network nodes that the terminal device can connect to.

* * * * *